UNITED STATES PATENT OFFICE.

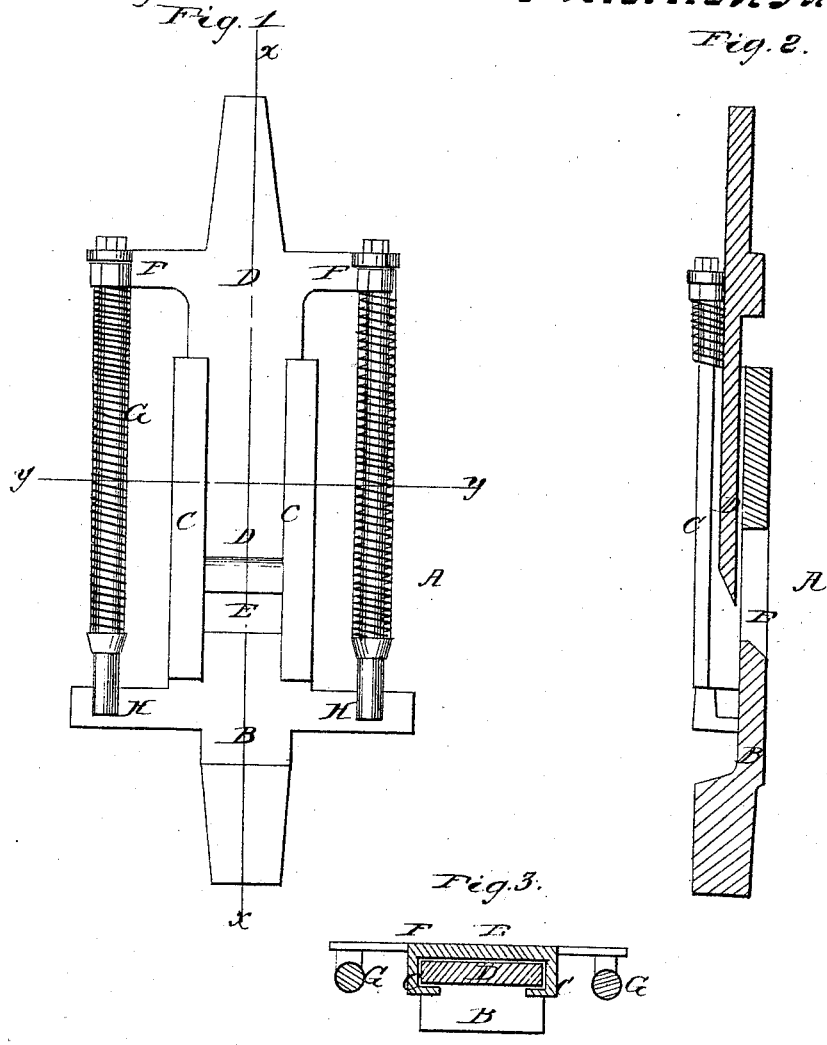

MATTHEW GORMLEY, OF WILNA, NEW YORK.

IMPROVEMENT IN MACHINE FOR CUTTING OFF NAILS.

Specification forming part of Letters Patent No. 80,068, dated July 21, 1868; antedated July 7, 1868.

*To all whom it may concern:*

Be it known that I, MATTHEW GORMLEY, of Wilna, in the county of Jefferson and State of New York, have invented a new and useful Improvement in Tool or Machine for Cutting Off the Heads of Nails, &c.; and I do hereby declare that the following is a full, clear, and exact description thereof, which will enable others skilled in the art to make and use the same, reference being had to the accompanying drawings, and to the letters of reference marked thereon.

The present invention relates to a new and improved tool for cutting off the heads of horseshoe-nails more particularly, although it can be applied to other articles, which tool is constructed in an extremely simple manner, and in use is most efficient and serviceable.

In the accompanying plate of drawings my improved tool is illustrated, Figure 1 being a front view or elevation of the same; Fig. 2, a central vertical section taken in the plane of the line $x\,x$, Fig. 1; and Fig. 3 a transverse section taken in the plane of the line $y\,y$, Fig. 1.

A in the drawings represents my improved tool. This tool A is formed of a plate or bar, B, suitable for being placed in the jaws of a vise and there held or clamped, and provided with upright parallels, bent over flanges C, between which a cutting-tool or chisel, D, is arranged to slide across and by the mouth or opening E in the said bar B to receive the nail to be cut. The chisel, at its shank, has side arms, F, by which it is arranged to move over the guide pins or stems G, fixed to the cross-arms H of the bar B, in suitable position therefor. I, coiled springs on stems G, for bringing back the chisel after each blow of the same; J, the head of the chisel-shank, for receiving the blow from the hammer.

Having thus described my invention, I claim as new and desire to secure by Letters Patent—

The shank B, having arms H H, flanges C C, and opening E, in combination with the sliding cutter D, rods G G, and springs, all constructed, arranged, and operating substantially as and for the purpose specified.

The above specification of my invention signed by me this 30th day of August, 1867.

MATTHEW GORMLEY.

Witnesses:
ROSWELL W. KEENE,
HENRY DEFRIEND.